Figure 1:
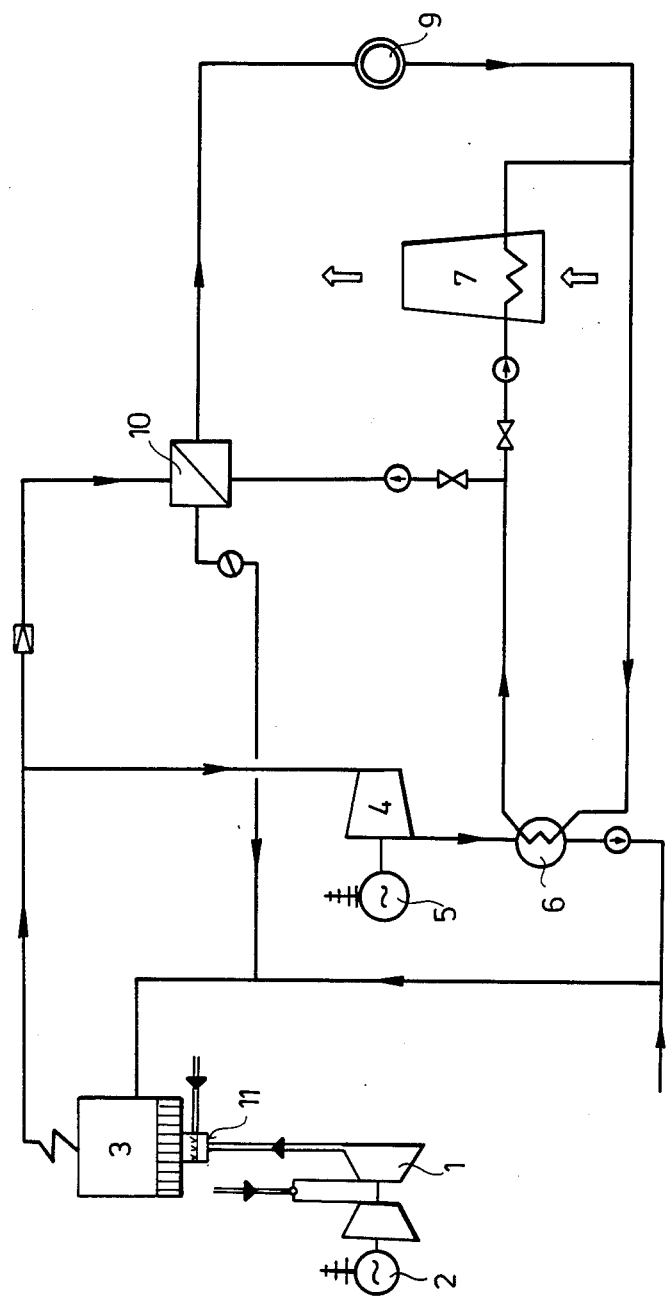

United States Patent [19]

Vadas et al.

[11] Patent Number: 4,677,307
[45] Date of Patent: Jun. 30, 1987

[54] PROCESS FOR THE REALIZATION OF COGENERATIVE SUPPLY OF ELECTRICITY AND HEAT (COGENERATION), PARTICULARLY IN INDUSTRIAL POWER PLANTS

[75] Inventors: Zoltán Vadas; Zoltán Belcsák; István Papp; Béla Wenzel; Géza Takácsy, all of Budapest, Hungary

[73] Assignee: Energiagazdalkodasi Intezet, Budapest, Hungary

[21] Appl. No.: 688,453

[22] Filed: Jan. 2, 1985

[30] Foreign Application Priority Data

Jan. 11, 1984 [HU] Hungary ................................. 69/84

[51] Int. Cl.⁴ ............................................. F01K 23/00
[52] U.S. Cl. ..................................... 290/2; 290/4 A; 290/43; 290/52; 290/54; 60/659
[58] Field of Search ..................... 290/2, 4 A, 43, 52, 290/54; 60/659, 690, 691, 692

[56] References Cited

U.S. PATENT DOCUMENTS 4,032,793 6/1977 Uram .......................................... 290/2
4,037,413 7/1977 Heller et al. ............................ 60/690
4,130,992 12/1978 Bitterlich et al. ..................... 60/659
4,274,256 6/1981 Kalt et al. ............................... 60/659
4,558,228 12/1985 Larjola ..................................... 290/2

Primary Examiner—William M. Shoop, Jr.
Assistant Examiner—Sharon D. Logan
Attorney, Agent, or Firm—Mandeville and Schweitzer

[57] ABSTRACT

Subject of the invention is a process for the realization of cogenerative supply of electricity and heat, and in given case for their combination with waste heat recovery, particularly in case of combined (gas-steam) cycle industrial power plants.

The essential feature of the invention is that during the season without heat demand the condenser with heating capacity N is operated by cooling with cooling tower, and during the heat-intensive season it is operated at a higher temperature required for the heat supplying operation mode, while the cooling tower (7) is disconnected partially or completely, and the resultant reduction of the specific expansion and heating capacity of the steam turbine (4) is compensated by increasing the steam parameters and steam output of the waste heat recovery boiler (3) with supplementary firing (11).

3 Claims, 3 Drawing Figures

PROCESS FOR THE REALIZATION OF COGENERATIVE SUPPLY OF ELECTRICITY AND HEAT (COGENERATION), PARTICULARLY IN INDUSTRIAL POWER PLANTS

The invention relates to a process for the realization of cogenerative supply of electricity and heat and in given case for their combination with waste heat recovery, particularly in combined (gas-steam) cycle industrial power plants.

The steam power plants for the cogenerative supply of electricity and heat have already been well known in the practice. These consist of steam boiler(s) heated with various fuels, as well as of back-pressure and/or extraction condensation steam turbine alternator(s). Such application of these is also known, where the steam is generated by industrial waste heat recovery boilers and the power plant meets the electricity and heat demand of the industrial works with high efficiency.

Known are furthermore the so-called combined (gas-steam) cycle power plants consisting of gas turbine(s), their waste heat recovery boiler(s) and steam turbine(s) driven by the steam of the latter ones. Both the gas turbine and steam turbine drive electric generator with high efficiency. However these power plants are generally not used for heat supply.

The common characteristic of the mentioned solutions is that during heat supply the electric power output of the power plant decreases just in the season when its reduction is undesirable. Further drawback of these power plants is that the optimal utilization of the steam of the waste heat recovery boilers realizable in the industrial works is not solved and they fail to make use of the power engineering and economic advantages gained by the supplementary firing of the waste heat recovery boilers.

Thus the purpose of the invention is to work out such combined process, which for the economic supply of electricity and heat combines in one system the advantages of the combined cycle, cogeneration and the waste heat recovery with supplementary firing as necessary.

The given problem is solved in such a manner, that - in the combined cycle power plants containing gas turbine-driven alternator, waste heat recovery and/or other steam boilers and steam turbine-driven alternator, or in such power plant which consists only of industrial waste heat recovery and/or other steam boilers and steam turbine-driven alternator(s)—the steam turbine of the power plants produce a specific heating capacity N during the season without heat demand when the condenser is cooled by cooling tower, while during the heat-intensive season the condenser is operated at a higher temperature as required by the heat supplying operation mode, when the cooling tower is disconnected partially or completely, and the resultant reduction of the specific expansion and heating capacity of the steam turbine is compensated by increasing the steam parameters and steam output of the waste heat recovery and/or other boilers with supplementary firing.

According to a preferred realization method of the invention, in order to meet the heat demand for the steam supply of the steam turbine, and/or the heat demand appearing on the heat exchanger, further waste heat recovery and/or other boiler(s) are connected to the system in addition to the waste heat recovery boiler of the gas turbine, the steam parameters and steam output of which are increased by supplementary firing as necessary.

The invention is described in detail by way of some examples with the aid of the enclosed drawing, in which:

FIG. 1: working diagram of a combined cycle power plant for realization of the process according to the invention.

Figure 2:
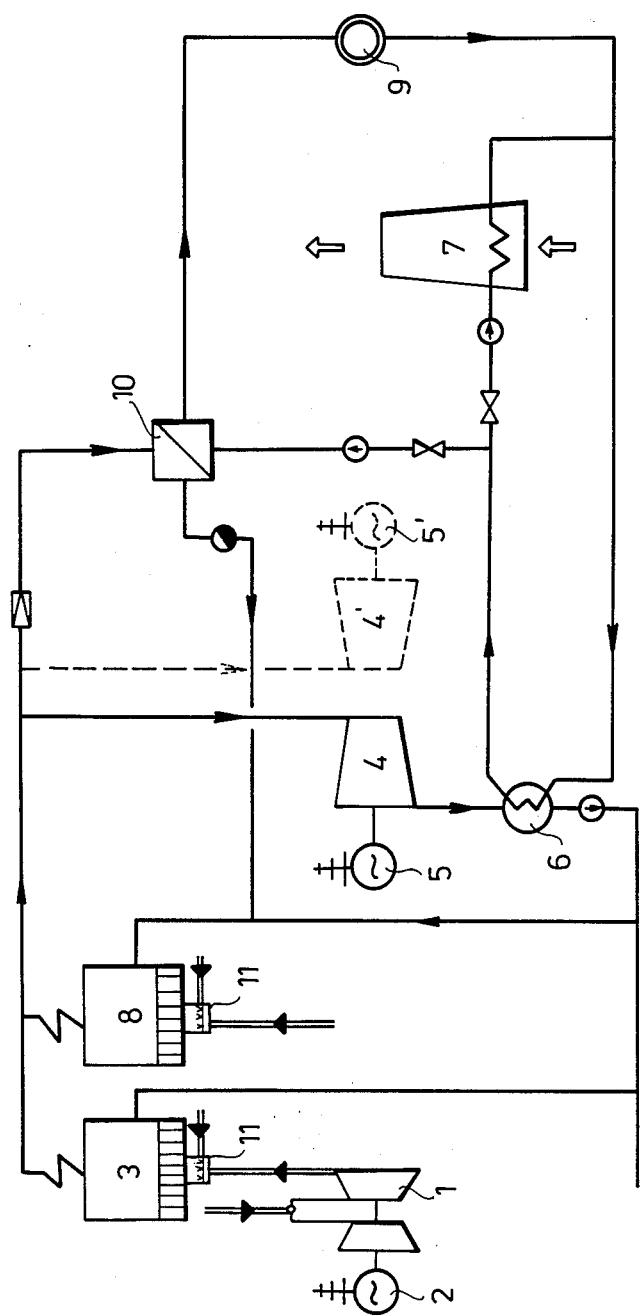

FIG. 2: working diagram of the power plant as shown in FIG. 1, supplemented with industrial waste heat recovery or other boilers.

Figure 3:
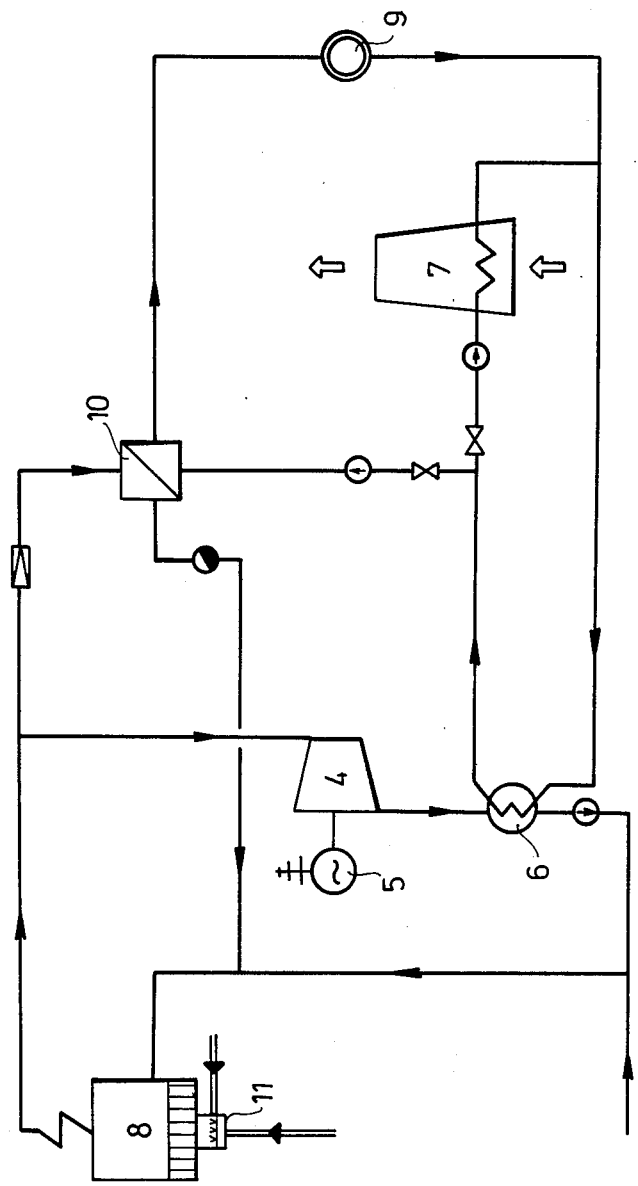

FIG. 3: working diagram of the steam turbine power plant operated with the steam of industrial waste heat recovery and/or other boilers.

The working diagram of the gas-steam (combined cycle) power plant as one of the possible realization methods of the process according to the invention is shown in FIG. 1, where generator 2 is driven by gas turbine 1, while the flue gas is utilized by waste heat recovery boiler 3 for steam generation. Condenser 6 of steam turbine 4 with specific heating capacity N is cooled by cooling tower 7 during the season without heat demand, while during the heat-intensive season it is switched to heat consumer 9 when the cooling tower 7 is disconnected completely or partially and the heating water is further heated as necessary in a steam/water heat exchanger 10. In this case the condenser 6 is operated at a higher temperature required by the heating. The resultant reduction of the extent of expansion is compensated during the heat-intensive season by supplementary firing 11 used for the waste heat recovery boiler 3, whereby the waste heat recovery boiler 3 produces more steam with higher steam parameters (pressure, temperature) and thus the power output of steam turbine 4 will not be reduced.

A possible alternative application of the process described in the previous diagram is shown in FIG. 2, where one or several industrial waste heat recovery and/or other boilers 8 too are connected to the steam side of the former system. These supplementary boilers 8 improve the steam balance of the system and increase the heating capacity. The connection and operation mode shown in FIG. 1 are different only to the extent that in case of excess steam the installation of further steam turbine 4' and generator 5' is possible as shown with dashed line in the diagram. The gas turbine 1 might as well be stopped during the season without heat demand, whereby the excess steam as well as the electric power are reduced. If in such case the power supply is possible from external source, then the gas turbine 1 is used as stand-by equipment. The increased heat demand is met and the resultant reduction of the power output of the steam turbine is compensated by supplementary firing 11 used in the waste heat recovery and/or other boilers 3, 8.

FIG. 3 shows such alternative application of the process according to the invention, when there is no gas turbine in the system and the steam is supplied by one or several industrial waste heat recovery and/or other boilers 8. The electricity is supplied by the generator (alternator) 5 driven by the steam turbine 4. The heat will be supplied here too through condenser 6 of increased temperature when the cooling tower 7 is disconnected partially or completely. The reduced expansion is compensated by the increased steam output and steam parameters of the waste heat recovery boilers 8, which in case of necessity are ensured by the supplementary firing 11 used in the boilers 8. The further part of the system are the same as those shown in FIG. 1.

The prominent adantages of the process according to the invention are the following:

(a) favourable specific heat consumption (b) optimal utilization of the waste heat during the winter-summer seasons (c) saving the cost of investment by use of the supplementary firing (d) stable electric power in the power plants supplying cogenerated electricity and heat.

What is claimed is:

1. A process for the realization of a cogenerated supply of electricity and heat with waste heat recovery as necessary, in a power plant including a gas turbine-driven generator, and a waste heat recovery boiler connected to the gas turbine to provide steam to a steam turbine-driven generator including a condensor and a cooling tower operatively associated with each other and with said stream turbine, comprising the steps of:

(a) providing said steam turbine with a capability of a specific heating capacity N during a season without heat demand and while its condensor is cooled by said cooling tower, (b) selectively partially or completely disconnecting said cooling tower, (c) selectively operating said condensor at a higher temperature, (d) selectively implementing steps (b) and (c) during a heat-intensive season to reduce the specific expansion and heating capacity of the steam turbine, (e) utilizing the resultant reduction of the specific expansion and heating capacity of the steam turbine realized by the selective implementation of steps (b), (c) and (d) in a means for heat consumption, and (f) simultaneously with the selective implementation of steps (b), (c) and (d) operating a supplementary firing on said waste heat recovery boiler to increase the steam parameters and steam output of said waste recovery boiler to compensate for said resultant reduction of the specific expansion and heating capacity of the steam turbine caused by the selective implementation of steps (b), (c) and (d).

2. The process according to claim 1, further characterized by providing several waste heat recovery boilers each of which includes a means for supplementary firing.

3. A process for the realization of cogenerated supply of electricity and heat with waste heat recovery in a power plant, comprising the steps of:

(a) providing and operating a means for waste heat recovery to generate steam, (b) providing a steam turbine-driven generator, (c) utilizing the steam generated by said means for waste heat recovery to operate said stem turbine-driven generator, (d) providing a condensor for operative association with said steam turbine, (e) operating said condensor during a season without heat demand at a specific heating capacity N, (f) providing a cooling tower in operative association with said condensor during said season without heat demand to maintain the specific heating capacity N of said condensor, (g) selectively operating said condensor at a higher temperature, (h) selectively partially or completely disconnecting said cooling tower from said condensor, (i) selectively implementing steps (g) and (h) during a heat-intensive season to reduce the specific expansion and heating capacity of the steam turbine, (j) utilizing the resultant reduction of the specific expansion and heating capacity of the steam turbine realized by the selective implementation of steps (g), (h) and (i) in a means for heat consumption, and (k) simultaneously with the selective implementation of steps (g), (h) and (i) operating a supplementary firing on said means for waste heat recovery to increase the steam parameters and steam output of said means for waste heat recovery to compensate for said resultant reduction of the specific expansion and heating capacity of the steam turbine caused by the selective implementation of steps (g), (h) and (i).

* * * * *